Patented Nov. 19, 1946

2,411,150

UNITED STATES PATENT OFFICE 2,411,150

OIL BLEND

Hector C. Evans, Cranford, and David W. Young, Roselle, N. J., assignors to Standard Oil Development Company, a corporation of Delaware No Drawing. Application September 20, 1941, Serial No. 411,652

12 Claims. (Cl. 252—56)

This invention relates to hydrocarbon oil blends with a combination of additives for more effectively improving viscosity-temperature relationships of the blends with restricted thickening.

A major requirement of motor lubricating oils and other industrial petroleum oil products is a satisfactory viscosity-temperature characteristic, i. e., as little variation of viscosity over a wide temperature range as possible. Petroleum lubricating oils with high viscosities at low temperatures have poor flow characteristics in a cold engine, while with proper low viscosities at low temperatures, many of them lack sufficient viscosity at operating temperatures for proper lubrication. Although, certain thickening agents are capable of giving these oils more satisfactory viscosity-temperature characteristics, in serving this purpose, they thicken the oils to unduly high viscosities, which increase power consumption and make the oils unfit for low temperature use. Accordingly, it is desirable to improve many petroleum oil products by lowering the rate of change of viscosity with temperature with preferably, a reduction in viscosity, or at least, only a small change in viscosity, at low temperatures.

In evaluating lubricating oils on their ability to maintain a more uniform viscosity with change in temperature, the well known viscosity index classification of Dean and Davis is widely used by the oil industry. This classification comparatively rates the oils by their relative variations in viscosities accurately determined at the temperature limits of 100° F. and 210° F. in Saybolt Universal seconds (S. S. U.). Using this method of classifying and rating lubricating oils, the best petroleum lubricating oils economically obtainable by refining of crude petroleum oils have a viscosity index (V. I.) of the order of 100. But, at the same time, the lubricating oils must meet grade requirements with respect to viscosity ranges determined, for example, by S. A. E. numbers which indicate whether the oil is too heavy, too light, or suitable for a certain use.

A variety of thickening V. I. improvers have been developed. These have been characterized largely by linear chain or two dimensional polymeric compounds having molecular weights above 800, derived mainly by simple polymerization, condensation, or copolymerization of low molecular weight monomeric reactants. In order to be useful as V. I. improvers, these synthetic polymeric compounds must meet with certain requirements of oil solubility, effectiveness in low concentrations, and stability under operating conditions to which the oil blends are subjected.

Notable examples of satisfactory V. I. improving thickeners are the highly saturated aliphatic hydrocarbon polymers typified by the polybutenes, which are derived by low temperature catalytic polymerization of pure isobutene or isobutene in mixtures with other olefins. Methods for the preparation of these polymers are described in the prior art. Other analogous aliphatic hydrocarbon V. I. improvers include hydrogenated diolefin polymers and copolymers of olefins with diolefins.

In addition to the aliphatic hydrocarbon polymer V. I. improvers, there have been developed aliphatic-aromatic types of polymers, represented by condensation polymers of alkyl halides with aromatic hydrocarbons, e. g. chlorinated wax with naphthalene, also, various oxygen-containing condensation polymers represented by polymerized acrylates, e. g., polymerized laurylmethacrylate, polymerized vinyl esters, and the like.

In accordance with the present invention, the V. I. improving effectiveness of the thickening polymers is greatly improved with a beneficial restriction in thickening of the oil blend by an added blending agent which is substantially immiscible with the thickening additive at temperatures below about 100° F., but whch, nevertheless, in suitable proportions forms a homogeneous blend with the thickened oil and substantially lowers the viscosity of the blend at these temperatures. The agents which act in this capacity will be referred to as non-solvent modifiers of the thickening V. I. improvers.

Another desirable property of the modifying agents used for controlling the thickening action of the thickening V. I. improvers in a lubricating oil is a suitably high flash point and low volatility to avoid impairment in the flash point value of the petroleum oil base and avoid loss by vaporization.

From a study of a large number of compounds for their effects on the thickening of oil blends, it was noted that modifiers of the thickeners which behave satisfactorily in desired low concentrations for the present purposes, in general, are polar organic compounds having dielectric constants substantially higher than those of the thickeners and hydrocarbon oils, e. g., substantially above 4 at 20° C. Although, such polar compounds are non-solvents for the thickening polymers at 0° F. to 100° F., they tend to have solvency for the polymers at above 100° F. in a hydrocarbon oil.

A test procedure which may be used to predetermine whether a polar organic compound has adequate non-solvent action on the polymer consists simply in dissolving a quantity of the polymer in a clear, colorless, light hydrocarbon solvent, such as naphtha, or kerosene, e. g., 10% by weight of the polymer in 25 cc. of the liquid solvent, then adding slowly, with slight agitation, to the resulting solution, the polar organic compound to be tested. If the polar organic compound added in an amount of about 5 to 75 cc. causes precipitation of the polymer from the solution, observed by the formation of turbidity, or separation of the polymer, then the polar organic compound is indicated to have the desired non-solvent property. However, while the polar compounds having lowest miscibility with the polymer prove to be the most effective modifiers, it is also important that effective amounts of such polar compounds be capable of being blended with or homogeneously dispersed in the thickened oils containing the polymer.

Among polar organic compounds tested and found to give favorable results in restricting the thickening action of polybutene and increasing the V. I. improving effectiveness of this polymer in hydrocarbon oil blends are high boiling oxy-esters, such as dibutoxy ethyl phthalate, butyl-acetyl ricinoleate, and triethylene glycol di-2-ethyl butyrate. The potency of these compounds for controlling the thickening effect of the polymer with added V. I. improvement depends upon a number of factors, hence all polar organic compounds, including those represented by high boiling oxygen-containing compounds, do not give exactly the same effects. For example, although castor oil is a non-solvent for the hydrocarbon polymer at ordinary temperatures, it was found ineffective by itself, because it could not be homogeneously blended with the thickened oil. However, castor oil could be used together with a more oil-soluble modifier, e. g., dibutoxy ethyl phthalate. Lower alkyl phthalate esters, such as methyl and ethyl phthalates, behave somewhat like castor oil. Thus, it is important to use a non-solvent modifier which blends homogeneously with the thickened oil despite its non-solvency for the thickener at ordinary temperatures.

The hydrocarbon oils to be used in the oil blends may be of any preferred type, such as those derived from the ordinary paraffinic, naphthenic, asphaltic, or mixed base crude petroleum stocks by suitable refining practices, or by synthesis. The hydrocarbon oil component is not limited to any specific viscosity or boiling range, other than by the specifications for the purpose they are to be employed. In making improved industrial oils, the hydrocarbon oil may have to meet certain high flash point and volatility requirements; in making lubricating oils, the hydrocarbon oil component should be substantially non-volatile and meet minimum flash point requirements.

The particular type of thickening V. I. improver to be used may vary with the type of hydrocarbon oil and the purpose of the blend. This component may amount to about 1% to 15%, or higher, by weight of the finished blend, but is generally used in motor oils in a proportion of about 1% to 5% by weight.

The nature and quantity of the thickener modifying agent also depends upon the particular hydrocarbon oils, the particular V. I. improving thickening agent, and the proportions of these components in the finished blend. With common types of petroleum lubricating oils and preferred aliphatic hydrocarbon polymers of the polybutene type as the V. I. improving thickener, the non-solvent modifier is preferably used in a proportion less than 50% by weight of the total blend, and for the sake of economy, in as small a proportion as possible, e. g., about 4 to 20%. The effects of various thickening and modifying blending agents in the oil blends will be apparent from the test results reproduced hereinafter.

One procedure used in formulating blends of the thickeners with petroleum oils and the added non-solvent modifier to control the action of the polymer was to blend the non-solvent modifier with a petroleum base oil together with a small proportion of more viscous oil until the viscosity of this blend corresponds closely to the original viscosity of the base oil at 210° F. for reference purposes, after which the thickening V. I. improver was added to the oil blend, slightly warmed and with agitation. The viscosities of the resulting blends were then determined accurately at 100° F. and 210° F. in order to observe the effects of the non-solvent modifier.

The amount of the thickening V. I. improver added to the oil in the blends was completely soluble in the hydrocarbon oil and was completely soluble in the blends with the non-solvent modifiers used in proper proportions, so that the heating and agitation of the blend is simply to facilitate solution. The procedure of the blending may be varied as desired. The non-solvent modifier for the thickening V. I. improver may be added subsequent to the thickening of the hydrocarbon oil, simultaneously with the thickener, and in practice be used without the added small proportion of more viscous hydrocarbon oil.

EXAMPLE

In a specific scientific investigation of how a satisfactory non-solvent for the thickener acts, use was made of the Staudinger method for determining viscosity characteristics of the thickening polymer, as explained in Staudinger's articles, Trans. Faraday, Soc. 29, 30, (1933). It was observed that a non-solvent modifier for the thickening polymer tends to reduce the specific viscosity of the polymer at lower temperatures, below about 100° F., with less reduction or even some increase at higher temperatures, thereby decreases the differential of the specific viscosities with respect to increase in temperature, and thus makes the desired modification in the thickening action of the polymers. This effect is illustrated by the following data, in which $N_{sp}$ denotes the specific viscosity (ratio of viscosity coefficient of thickened oil to that of the oil minus 1) and C denotes the concentration of the polymers having varying molecular weights which were tested in samples of the same petroleum lubricating oil.

TABLE 1

*Viscosity characteristics of polybutenes in hydrocarbon oil blends*

| Approx. M. W. of polybutene | 20° C. $N_{sp}/C$ | 45° C. $N_{sp}/C$ | 65° C. $N_{sp}/C$ | Differential of specific viscosities unit change in $N_{sp}/C$ 20° to 65°C. |
|---|---|---|---|---|
| 20,000 | 0.24 | 0.20 | 0.15 | 0.09 |
| 45,000 | 0.28 | 0.24 | 0.18 | 0.10 |
| 98,000 | 0.42 | 0.35 | 0.26 | 0.16 |

TABLE 2

*Viscosity characteristics of polybutenes in hydrocarbon oil blends with 10% non-solvent (dibutoxy ethyl phthalate)*

| Approx. M. W. of polybutene | 20° C. $N_{sp}/C$ | 45° C. $N_{sp}/C$ | 65° C. $N_{sp}/C$ | Differential of specific viscosities unit change in $N_{sp}/C$ 20° to 65°C. |
|---|---|---|---|---|
| 20,000 | 0.19 | 0.18 | 0.16 | 0.03 |
| 45,000 | 0.23 | 0.22 | 0.20 | 0.03 |
| 98,000 | 0.40 | 0.36 | 0.33 | 0.07 |

To illustrate how the non-solvent modifier acts to beneficially decrease thickening and at the same time improve viscosity-temperature characteristics of the polymer thickened oil on the V. I. scale, the following data are presented:

TABLE 3

| | S. S. U. vis. at— | | V. I. |
|---|---|---|---|
| | 100° F. | 210° F. | |
| Hydrocarbon reference oil (S. A. E. 10W) | 93.8 | 37.32 | 8.9 |
| *Blends with thickener and modifier used separately* | | | |
| 36% dibutoxy ethyl phthalate (+4% oil of 65 S. S. U. at 210° F.) | 89.64 | 36.74 | 9.7 |
| 2% polybutene 13,000 M. W. | 227.7 | 51.63 | 128.0 |
| *Blends with thickener and modifier used together* | | | |
| 2% polybutene +36% dibutoxy ethyl phthalate (+4% oil of 65 S. S. U. at 210° F.) | 121.5 | 46.04 | 171.7 |

The data in Table 3 illustrate how the modifier itself has little effect on the V. I. of a base oil, but when used in conjunction with the thickening V. I. improver, considerably increases in V. I. and beneficially lowers the thickening at the lower temperature level (100° F.), so that the resulting blend is more useful as a lighter grade, lower power-consuming lubricating oil of highly improved V. I. value. Pronounced beneficial effects were obtained with a high V. I. petroleum lubricating oil base, as shown in the following data:

TABLE 4

| | S. S. U. vis. at— | | V. I. |
|---|---|---|---|
| | 100° F. | 210° F. | |
| Hydrocarbon reference oil | 239.2 | 49.20 | 102.1 |
| *Blends with thickener and modifier used separately* | | | |
| 18% dibutoxy ethyl phthalate (+2% 65 S. S. U. at 210°F. oil) | 92.32 | 38.10 | 65.8 |
| 0.6% polybutene | 316.5 | 54.76 | 107.4 |
| *Blend with thickener and modifier used together* | | | |
| 0.6% polybutene +18% dibutoxy ethyl phthalate (+2% 65 S. S. U. at 210° F. oil) | 273.3 | 53.25 | 116.4 |

The following data illustrate how the non-solvent modifier, dibutoxy ethyl phthalate, acts in smaller concentrations on hydrocarbon oils thickened by aliphatic-aromatic hydrocarbon V. I. improving polymers formed by condensation of highly chlorinated wax with naphthalene.

TABLE 5

| | S. S. U. vis. at— | | V. I. |
|---|---|---|---|
| | 100° F. | 210° F. | |
| Hydrocarbon reference oil | 93.8 | 37.32 | 8.9 |
| *Blends with thickener and modifier used separately* | | | |
| 9% dibutoxy ethyl phthalate (+2% 65 S. S. U. at 210° F. oil) | 97.16 | 37.57 | 8.8 |
| 5% thickener | 214.8 | 52.94 | 140.9 |
| *Blend with thickener and modifier used together* | | | |
| 5% thickener +9% dibutoxy ethyl phthalate (+2% 65 S. S. U. at 210° F. oil) | 211.1 | 52.90 | 143.0 |

Effects of dibutoxy ethyl phthalate with a polyacrylate thickener is shown in the following data:

TABLE 6

| | S. S. U. vis. at— | | V. I. |
|---|---|---|---|
| | 100° F. | 210° F. | |
| Hydrocarbon reference oil | 92.40 | 37.22 | 9.8 |
| *Blend with polyacrylate thickener alone* | | | |
| 3% polyacrylate unmodified | 140.5 | 44.69 | 137.5 |
| *Blend with thickener and polymer used together* | | | |
| 3% polymer +40% dibutoxy ethyl phthalate | 136.1 | 44.56 | 141.4 |

Triethylene glycol di-2-ethyl butyrate is a non-solvent modifier having somewhat greater potency than the dibutoxy ethyl phthalate, as shown in the following data on its use with polybutene type and polyacrylate type thickeners.

TABLE 7

*Effect of triethylene glycol di-2-ethyl butyrate as non-solvent modifier on polybutene thickened oil*

| | S. S. U. vis. at— | | V. I. |
|---|---|---|---|
| | 100° F. | 210° F. | |
| Hydrocarbon reference oil (S. A. E. 10W) | 107.8 | 38.2 | 25 |
| *Blend with polybutene thickener unmodified* | | | |
| 2% polybutene | 222.2 | 50.63 | 124 |
| *Blends with polybutene thickener and modifier* | | | |
| 2% polybutene +6.4% modifier | 194.2 | 48.56 | 127 |
| 2% polybutene +12.8% modifier | 184.4 | 48.27 | 132 |
| 2% polybutene +32% modifier | 147.1 | 46.49 | 147 |

TABLE 8

*Effect of triethylene glycol di-2-ethyl butyrate as non-solvent modifier on polyacrylate thickened oil*

| | S. S. U. vis. at— | | V. I. |
|---|---|---|---|
| | 100° F. | 210° F. | |
| Hydrocarbon reference oil | 54.3 | 33.80 | 70 |
| *Blends with polyacrylate thickener and modifier used separately* | | | |
| 10% modifier | 54.28 | 33.77 | 70 |
| 3% polyacrylate thickener | 69.9 | 37.25 | 144.8 |
| *Blend with thickener and modifier used together* | | | |
| 3% polyacrylate +10% modifier | 66.97 | 37.09 | 152.8 |

Additional specific types of compounds found to act as effectively non-solvent modifiers for obtaining blends of improved V. I. with lower viscosity at temperatures below about 100° F. in clear, thickened hydrocarbon oil blends are represented by:

Butyl-acetyl ricinoleate

Diethylene glycol (mono) laurate

Glyceryl oleate

Diglycol oleate

Butoxy ethyl stearate

Methoxy ethyl oleate

Butyl stearate

Tributyl aconitate

The number and variety of effective modifiers is much larger than shown by the illustrative specific examples, and can be further extended by the use of the guiding explanations given.

Some of the modifiers are more effective than others on account of their greater non-solvent action on the thickeners. It is apparent that a number of the preferred modifiers for use in lubricating oils are high boiling oxy-esters, i. e. hydroxy or alkoxy esters. Some of the modifiers are more effective with one kind of thickener than another. For example, methoxy ethyl oleate appears to be more effective than triethylene glycol di-2-ethyl butyrate with a polyacrylate thickener.

The non-solvent modifiers may be only partially miscible with the hydrocarbon oils, which occurs often in the case of highly potent modifiers. Those having too low solubility in the hydrocarbon oil for making a homogeneous blend may be used beneficially together with a more oil-soluble modifier.

The use of castor oil as a non-solvent modifier illustrates the importance of homogeneously blending the modifier with the thickened oil to secure a further improvement in V. I. and at the same time restrict thickening. Castor oil is found to restrict thickening to some extent in low concentrations with a polybutene thickened 102 V. I. oil, but it also lowered the V. I. and made the solution cloudy. When the castor oil was jointly used in small concentrations with a more oil-soluble modifier, dibutoxy ethyl phthalate, in the polybutene thickened oil, the blend was clear, the thickening was reduced, and the V. I. of the thickened oil was increased considerably, from 124.4 to 157.0.

Hydrogenated castor oil, considered to have more oil solubility than castor oil, also increased the thickening action of the polymer and adversely affected the viscosity index of the oil when used alone as a modifier, and further demonstrated the need of having the modifier homogeneously blended with the thickened oil.

Another extension in the utilization of the present invention is illustrated by the effects of the modifiers on thickeners in hydrocarbon oils having extremely low V. I. values. For example, using a low V. I. phenol extract of a naphthenic lubricating oil, a study was made of how a non-solvent modifier affected the oil and its thickened blends. The following data illustrate how a modifier jointly with the thickener tremendously improved the V. I. with restricted thickening.

TABLE 9

| Composition of blends | S. S. U. vis. at— | | V. I. |
|---|---|---|---|
| | 100° F. | 210° F. | |
| Oil+5% dibutoxy ethyl phthalate | 1,035 | 59.7 | −77.6 |
| Oil+4% polybutene (13,000 M. W.) | 2,061 | 92.6 | +16 |
| Oil+4% polybutene (13,000 M. W.)+5% dibutoxy ethyl phthalate | 1,500 | 99.03 | +76 |

The modified thickened oil blends, prepared in accordance with this invention, may contain two or more different types of thickeners and two or more different types of modifiers. They may also contain small amounts of other kinds of oil additives used for stabilizing, dyeing, inhibiting oxidation, imparting oiliness, lowering the pour point, etc.

The present invention has been illustrated by numerous examples but is not intended to be limited thereby, nor is it intended to be limited by any theory on the mechanism by which the improvement is obtained, nor to any particular kind of hydrocarbon oil, polymer, modifier, or blend. Any modification which comes within the spirit of the invention is intended to be included within the scope thereof as defined in the following claims.

We claim:

1. A lubricating oil comprising a hydrocarbon lubricating oil blended with about 1% to 5% by weight of a polybutene viscosity index improving thickener and homogeneously blended with about 4 to 50% by weight of a substantially non-volatile oxy-ester which is a non-solvent for said polybutene at temperatures below 100° F. as shown by its ability to precipitate polybutene from a 10% solution thereof in a light hydrocarbon solvent when added at room temperature in amounts of from about 20 to 300% based on said solution, said oxy-ester being homogeneously dissolved in the thickened blend to substantially reduce the viscosity thereof at 100° F. and increase the viscosity index of the thickened oil blend.

2. A lubricating oil composition in accordance with claim 1, in which said ester, is a high boiling aliphatic alkoxy ester.

3. A lubricating oil composition in accordance with claim 1, in which said ester is a high boiling aliphatic hydroxy ester.

4. A hydrocarbon oil blend containing a minor proportion of an oil-soluble acrylate polymer thickener lowering the rate of change of viscosity with the temperature of the oil and a sufficient amount of a substantially now-volatile oxy-ester which is a non-solvent at ordinary temperatures for said polymer as shown by its ability to precipitate said polymers from a 10% solution thereof in a light hydrocarbon solvent when added at room temperatures in amounts of from about 20 to 300% based on said solution, said oxy-ester being homogeneously dissolved in the blend to substantially reduce thickening by the polymer at a temperature below about 100° F. and give the oil a lower rate of change of viscosity with temperature.

5. A hydrocarbon oil blend containing a minor proportion of a synthetic aliphatic-aromatic condensation polymer which lowers the rate of change of viscosity with the temperature of the oil and a sufficient amount of a substantially non-volatile oxy-ester which is a non-solvent at ordinary temperatures for said polymer as shown by its ability to precipitate said polymers from a 10% solution thereof in a light hydrocarbon solvent when added at room temperatures in amounts of from about 20 to 300% based on said solution, said oxy-ester being homogeneously dissolved in the blend to substantially reduce thickening by said polymer at temperatures below about 100° F. and give the oil blend a lower rate of change of viscosity with temperature.

6. A lubricating oil blend comprising a hydrocarbon lubricating oil blended with about 1% to 5% by weight of a viscosity index improving thickener and a sufficient amount of triethylene glycol di-2-ethyl butyrate blended with the thus thickened oil to substantially reduced the viscosity and raise the viscosity index of the thickened oil blend, said thickener being normally immiscible with triethylene glycol di-2-ethyl butyrate.

7. An oil blend comprising a hydrocarbon lubricating oil thickened by about 1 to 15% by weight of a viscosity index improving thickener and blended with a minor proportion of dibutoxy ethyl phthalate, said thickener being normally immiscible with dibutoxy ethyl phthalate.

8. An oil blend comprising a hydrocarbon lubricating oil thickened by about 1 to 15% by weight of a viscosity index improving thickener and blended with a minor proportion of butyl acetyl ricinoleate, said thickener being normally immiscible with butyl acetyl ricinoleate.

9. A hydrocarbon oil blend comprising a hydrocarbon lubricating oil blended with a minor proportion of a soluble thickening polymeric compound selected from the group consisting of polybutenes, hydrogenated diolefin polymers, condensation polymers of alkyl halides with aromatic hydrocarbons and polymerized vinyl esters and with a substantially non-volatile oxy-ester which is a non-solvent for said thickening polymeric compounds at ordinary temperatures as shown by its ability to precipitate said polymers from a 10% solution of the polymer in a light hydrocarbon solvent when added at about room temperature in amounts of from about 20 to 300% based on said solution, said oxy-ester being homogeneously dissolved in said blend in an amount sufficient to lower the rate of change of viscosity with temperature of said blend from the rate of change of viscosity with temperature of a blend consisting of the lubricating oil and polymer.

10. A hydrocarbon oil blend comprising a hydrocarbon lubricating oil blended with about 1 to 15% by weight of a soluble thickening polymeric compound selected from the group consisting of polybutenes, hydrogenated diolefin polymers, condensation polymers of alkyl halides with aromatic hydrocarbons and polymerized vinyl esters and with a substantially non-volatile oxy-ester which is a non-solvent for said thickening polymeric compounds at ordinary temperatures as shown by its ability to precipitate said polymers from a 10% solution of the polymer in a light hydrocarbon solvent when added at about room temperature in amounts of from about 20 to 300% based on said solution, said oxy-ester being homogeneously dissolved in said blend in an amount sufficient to lower the rate of change of viscosity with temperature of said blend from the rate of change of viscosity with temperature of a blend consisting of the lubricating oil and polymer.

11. A hydrocarbon oil blend comprising a hydrocarbon lubricating oil blended with about 1 to 15% by weight of a soluble thickening polymeric compound selected from the group consisting of polybutenes, hydrogenated diolefin polymers, condensation polymers of alkyl halides with aromatic hydrocarbons and polymerized vinyl esters and with about 4 to 50% by weight of a substantially non-volatile oxy-ester which is a non-solvent for said thickening polymeric compounds at ordinary temperatures as shown by its ability to precipitate said polymers from a 10% solution of the polymer in a light hydrocarbon solvent when added at about room temperature in amounts of from about 20 to 300% based on said solution, said oxy-ester being homogeneously dissolved in said blend and imparting to the blend a lower rate of change of viscosity with temperature than is possessed by a blend consisting of the lubricating oil and polymer.

12. A hydrocarbon oil blend comprising a hydrocarbon lubricating oil blended with about 1 to 15% by weight of a polybutene viscosity improving thickener and with a substantially non-volatile oxy-ester which is a non-solvent for said polybutene at ordinary temperature as shown by its ability to precipitate polybutene from a 10% solution thereof in a light hydrocarbon solvent when added at about room temperature in amounts of from about 20 to 300% based on said solution, said oxy-ester being homogeneously dissolved in said blend in an amount sufficient to lower the rate of change of viscosity with temperature of said blend from the rate of change of viscosity with temperature of a blend consisting of the lubricating oil and a polybutene.

HECTOR C. EVANS.
DAVID W. YOUNG.